United States Patent Office 2,956,388
Patented Oct. 18, 1960

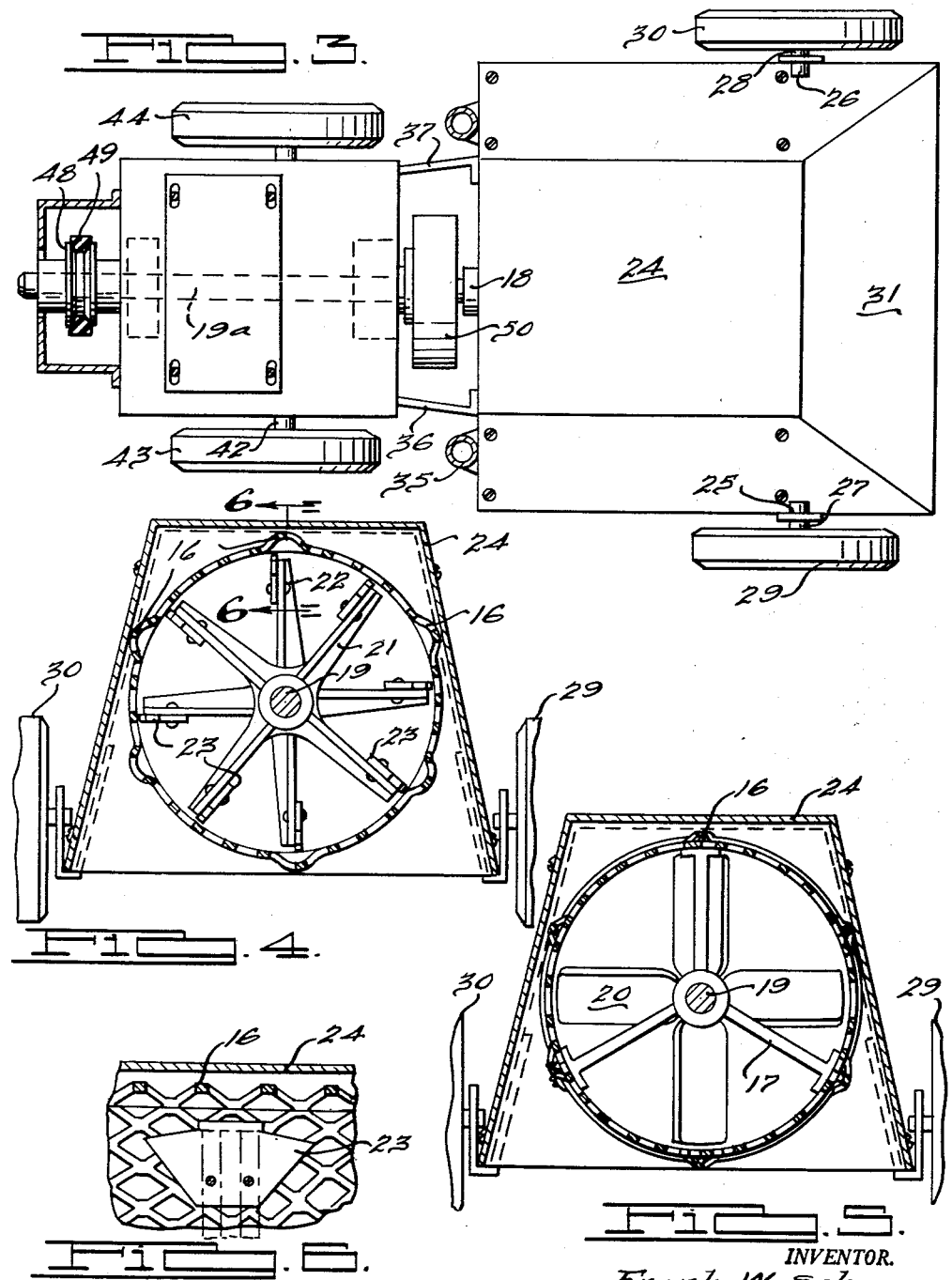

2,956,388

LAWN SWEEPER AND MATERIAL DISINTEGRATOR

Frank W. Schwarz, 3828 Cumberland, Berkley, Mich.

Filed Mar. 18, 1959, Ser. No. 800,146

4 Claims. (Cl. 56—501)

This invention relates to a new and improved device for gathering leaves, mown grass, twigs, sticks, etc., that collect on lawns or surface areas, grinding and disintegrating the gathered material, and then distributing the finely reduced product back upon the cleared surface as a fertilizing mulch.

In my Patent No. 2,840,972, issued July 1, 1958, I disclosed a lawn sweeper and material disintegrator wherein a mobile horizontally disposed drum having an open front end and a closed rear end and a foraminous peripheral wall affording discharge openings for disintegrated material, gathers material which is taken into said expanded metal drum, disintegrates and immediately distributes it upon the cleared surface from the entire expanded metal drum.

Although this device has worked satisfactorily, an even more satisfactory result is produced by the instant disclosure wherein there are provided a plurality of convex relief recesses formed in the foraminous peripheral wall of the disintegrating drum.

A still further object of the invention is to provide a new and improved beater pad to more thoroughly disintegrate material gathered into the device.

The above and other objects of the invention will be seen from the following more detailed description, and from the drawings, wherein:

Fig. 1 is a perspective view of the device.

Fig. 2 is a side elevation showing parts of the device in section and broken away to show the interior of the leaf mulching chamber.

Fig. 3 is an enlarged top plan view with parts broken away to show the driving mechanism.

Fig. 4 is a section taken substantially along line 4—4 of Fig. 2.

Fig. 5 is a section taken substantially along line 5—5 of Fig. 2; and

Fig. 6 is an enlarged section taken substantially along line 6—6 of Fig. 4.

Referring now to the drawings, the device is what might be termed a built-up structure of light gauge sheet steel, or the like, wherein a housing carrying the front wheels of the device acts as a cover for a disintegrator or crushing chamber, and wherein the platform carrying the power unit also supports the crushing chamber, so that when the hood or housing member is secured to the crusher chamber frame, there is formed a complete unit ready for use.

A horizontally disposed crushing chamber or drum 10 is provided, the same being formed as a tube of expanded metal having a foraminous peripheral wall 51 affording discharge openings 52 for disintegrated material, said drum being disposed between a pair of plate members 11, 12, said plate 11 having an opening 13 therein to allow the passage of leaves, etc., therethrough and into the crushing drum and to provide a support for one end of the drum member 10 which passes therethrough and is bent back to form a peripheral flange 14 which in turn is secured to said plate 11 to hold that end of drum 10 in place. Plate 12 is a solid member which in turn supports a ring member 15 which in turn is adapted to receive a portion of the rear end of drum 10 and support same. Formed in drum 10 and spaced about the same, as shown best in Figs. 4 and 5 of the drawings, are a plurality of longitudinally-formed convex equally spaced relief recesses 16, the same being formed in the foraminous peripheral wall of drum member 10. A spider member 17, Figs. 2 and 5, is provided, the same being mounted within drum 10 as by screws 53, Fig. 2, provides a three point suspension bearing member. Another bearing member 18 is secured within rear plate member 12, said bearing members 17, 18, being adapted to support and journal a power shaft 19. On the forward end of shaft 19 adjacent and in line with opening 13 in plate 11, a fan 20 is suitably mounted and secured, as with a set screw and key, and immediately back of spider bearing 17 are mounted on shaft 19 a pair of crusher blades 21, 22, the same being spaced apart and secured to shaft 19 by means of set screws and keys, each blade having secured near its outer end a beater pad 23, Fig. 6, said new type pad having a top flared portion approximately two and three-quarter inches in width, the same being secured to crusher blades 21, 22, by means of spot-welding, or the like. The pads 23, as shown in Fig. 2, partially overlap and the blades of the crushers are mounted on shaft 19 so that no two of the blades are in longitudinal alignment.

To enclose the crusher drum 10 there is provided a metal hood or housing member 24, the same being shaped, as shown best in Fig. 1. A pair of opposed wheel brackets 25, 26, are provided, the same being secured to the lower front leading edge of housing 24 and forming a journal for wheel axles 27, 28, of front wheels 29, 30. The front portion of housing 24 is flared, as at 31, to provide the front portion of a nozzle 32, the other portion of said nozzle being formed by plate 11. Housing 24 fits over crushing drum 10 and seats on top of plate flange 33 formed on plate 12 and plate flange 34 formed on plate 11 and can be quickly fastened in place by means of screws, or the like. When the four sided housing 24 is in place it will be seen from Figs. 2, 4 and 5, that there is adequate space between the inside of the housing and the crushing chamber to allow discharged material to pass therebetween. A detachable pusher handle 35 is provided, the same being conveniently secured to the back of plate member 12.

A power unit is provided, the same being separated from, but secured to the crushing unit by means of brackets 36, 37, which in turn hold plate 12 rigid with power base 38, while an additional bracket 39 is provided for additional support holding the gas tank unit 40 to the upper portion of plate 12. Base 38 has a portion of the sides thereof turned down to form a pair of opposed bracket members 41 adapted to receive axle 42, said axle 42 passing beneath base 38 to rotatably support a pair of wheels 43, 44. Base 38 has mounted thereon a motor 45 which in turn has a take-off shaft 46 on which is secured a belt pulley 47. Another pulley 48 is provided, the same being adapted to be secured to power shaft 19a by a set screw, or the like, and belt 49 is provided for a belt run between pulleys 47, 48. To couple drive shafts 19a and 19 there is provided within a suitable housing a conventional centrifugal type clutch 50.

The manner in which the device operates is as follows:

The device is pushed by means of handle 35 to the place where it is to be used and the motor 45 on the motor unit is started by use of the conventional pull rope. Although a gasoline type motor is shown in Fig. 1, any type of motor may be used just so long as the source of power provides sufficient revolutions per minute to create the necessary crushing action and vacuum to thoroughly disintegrate the material being processed. As take-off shaft 46 rotates, pulley 47 is also rotated and power is imparted to pulley 48 through belt run 49, and inasmuch as pulley 48 is secured to drive shaft 19a, said drive shaft is rotated and in turn power is transmitted to driven shaft 19 through centrifugal clutch 50. This type of clutch allows slippage so that if some type of foreign matter, such as steel, should get up into the crushing drum, the clutch allows shaft 19 to stop rotating without causing damage to drive shaft 19a until the motor can be shut off.

Fan 20 and cutter blades 21, 22 are all secured to driven shaft 19 and rotate in unison therewith on account of the same having a horizontal common rotatable power shaft or driven and drive shaft 19a, 19. As the unit is propelled along the ground by means of handle 35, intake nozzle 32, which is open throughout the extent of its bottom and which open bottom is positioned to travel close to the ground surface, allows, leaves, etc., to be sucked therein by means of a draft of air provided by the rotation of fan 20, which in turn draws said material through opening 13 in plate 11 and on into crushing drum 10 where it immediately comes in contact with crusher blades 21, 22 which are rotating at the same speed as that of fan 20. Inasmuch as no two of these blades are in longitudinal alignment, the picked-up matter is pulverized by means of the blades and beater pads 23 secured to the end thereof, said beater pads, as shown best in Fig. 6, being quite different in construction from those disclosed in Patent No. 2,840,972, where the pad was of substantially rectangular shape. The new and improved pad is substantially triangular in shape with wing-type extremities that provide a clawing action as the blades are turned, which in turn more thoroughly chops the material being processed and does not allow it to become packed in the disintegrating drum. The equally spaced relief recesses 16 shown best in Figs. 4 and 5, which are formed as convex recesses in the foraminous peripheral wall of drum 10, allows each individual beater blade to receive relief six times every revolution of shaft 19, owing to the fact that material being disintegrated has a chance to pass into the release recesses formed in drum 10. There are eight blades revolving at approximately 2500 revolutions per minute which gives what might be termed a hammer-mill type of action within drum 10. This set up also tends to change the pattern of the operation many times every revolution, which in turn reduces horse power requirements to operate the device.

All of the matter that has been sufficiently processed passes directly out through the openings in crushing drum 10 and is thrown against the inside of housing 24, and, inasmuch as there is space between drum 10 and the inner surface of housing 24, the disintegrated material falls at once to the ground through the bottom of the housing which is completely open and is distributed the entire open area of the bottom of housing 24. Inasmuch as the bottom of housing 24 extends below the bottom of drum 10 and the rear end of the drum is closed, the disintegrated material is deposited in a definite path directly below the open bottom of the housing.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. In a combined lawn sweeper and material disintegrator, the combination of a horizontally disposed drum having an open front end, a closed rear end and a foraminous peripheral wall having a plurality of longitudinally-formed convex equally spaced relief recess formed therein, said wall affording discharge openings for disintegrated material, an open bottomed housing mounted on said drum and surrounding the same in spaced relation whereby disintegrated material discharged through said openings may be delivered through the space between the drum and the open bottomed housing to the ground, said housing extending below the bottom of the drum, traveling wheels mounted on said housing, the front end portion of said housing providing a material pick-up nozzle in communication with the open front end of the drum, a rotatable shaft disposed axially in the drum, a suction fan mounted on said shaft adjacent said open front, and chopping blades mounted on said shaft intermediate the suction fan and said closed rear end, and means for rotating said shaft.

2. The combination as defined in claim 1, together with means for removably mounting said housing on said drum, said housing being removable from the drum together with said wheels.

3. In a combined lawn sweeper and material disintegrator, the combination of a vertical front plate having an open front end, an imperforate back plate spaced rearwardly from said front plate, a horizontal drum extending between and secured to the front and back plates concentrically with said inlet opening and having a foraminous peripheral wall having a plurality of longitudinally-formed convex equally spaced relief recesses formed therein affording discharge openings for disintegrated material, a bottomless housing removably mounted on said front and back plates and surrounding said drum in spaced relation whereby material discharged through said discharge openings may be delivered through the space between the drum and said housing to the ground, said housing extending below the bottom of the drum, the front end portion of said housing providing a material pick-up nozzle in communication with the inlet opening in said front plate, traveling wheels provided on said housing and removable therewith from said front and back plates, a rotatable shaft disposed axially in said drum, a suction fan mounted on said shaft adjacent said open front, and chopping blades mounted on said shaft intermediate the suction fan and said closed rear end, a wheeled chassis disposed rearwardly of and secured to said back plate, and a power plant mounted on said chassis and operatively connected to said shaft.

4. The combination as defined in claim 3 wherein said chopping blades are spaced longitudinally on said shaft, together with elongated beater members provided on said blades, said beater members having a top flared portion, said beater members of the respective blades being longitudinally overlapped.

References Cited in the file of this patent

UNITED STATES PATENTS

| | | |
|---|---|---|
| 2,590,734 | Strong | Mar. 25, 1952 |
| 2,677,223 | Schwarz | May 4, 1954 |
| 2,706,372 | Blydenburgh | Apr. 19, 1955 |
| 2,731,995 | Sutherland et al. | Jan. 24, 1956 |
| 2,840,972 | Schwarz | July 1, 1958 |